United States Patent
Takagi

(10) Patent No.: US 9,046,163 B2
(45) Date of Patent: Jun. 2, 2015

(54) TRANSMISSION DEVICE, DRIVING ASSEMBLY INCLUDING THE TRANSMISSION DEVICE, AND IMAGE FORMING APPARATUS INCLUDING THE DRIVING ASSEMBLY

(71) Applicant: Hiroaki Takagi, Kanagawa (JP)

(72) Inventor: Hiroaki Takagi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/294,196

(22) Filed: Jun. 3, 2014

(65) Prior Publication Data

US 2014/0364277 A1    Dec. 11, 2014

(30) Foreign Application Priority Data

Jun. 11, 2013 (JP) .................................. 2013-122727

(51) Int. Cl.
| | |
|---|---|
| F16H 55/12 | (2006.01) |
| F16H 57/00 | (2012.01) |
| F16H 55/06 | (2006.01) |

(52) U.S. Cl.
CPC ............ *F16H 57/0025* (2013.01); *F16H 55/06* (2013.01)

(58) Field of Classification Search
None
See application file for complete search history.

(56) References Cited

U.S. PATENT DOCUMENTS

| | | | | | |
|---|---|---|---|---|---|
| 3,186,190 | A | * | 6/1965 | Maillot | 464/31 |
| 3,186,247 | A | * | 6/1965 | Burrell | 474/174 |
| 3,541,871 | A | * | 11/1970 | Burrell | 74/447 |
| 3,613,472 | A | * | 10/1971 | Held | 74/391 |
| 3,651,708 | A | * | 3/1972 | Muller | 74/447 |
| 5,452,622 | A | * | 9/1995 | Fenelon | 74/411 |
| 6,324,930 | B1 | * | 12/2001 | Forsyth | 74/446 |
| 6,446,523 | B1 | * | 9/2002 | Ota et al. | 74/432 |
| 6,508,140 | B2 | * | 1/2003 | Zaps | 74/411 |
| 6,591,707 | B2 | * | 7/2003 | Torii et al. | 74/425 |
| 7,814,809 | B2 | * | 10/2010 | Shinohara | 74/443 |
| 8,225,689 | B2 | * | 7/2012 | Brosowske et al. | 74/440 |

FOREIGN PATENT DOCUMENTS

| | | |
|---|---|---|
| JP | 9-114160 | 5/1997 |
| JP | 2002-266952 | 9/2002 |
| JP | 4435093 | 1/2010 |
| WO | WO2005/046957 A1 | 5/2005 |

OTHER PUBLICATIONS

Application No. 2013/011,860 filed Jan. 25, 2013.

* cited by examiner

*Primary Examiner* — Dirk Wright
(74) *Attorney, Agent, or Firm* — Harness, Dickey & Pierce, P.L.C.

(57) ABSTRACT

A transmission device includes a rotatable shaft, a first transmission member, and a second transmission member. The first transmission member includes a first fitting portion fitted coaxially to an outer circumferential surface of the rotatable shaft, and is attached to the rotatable shaft to transmit torque. The second transmission member is rotatably driven by a driving device and includes a second fitting portion fitted coaxially to the outer circumferential surface of the rotatable shaft. The second transmission member is connected coaxially to the first transmission member while the first and the second fitting portions are fitted to the outer circumferential surface of the rotatable shaft.

9 Claims, 10 Drawing Sheets

TRANSMISSION DEVICE, DRIVING ASSEMBLY INCLUDING THE TRANSMISSION DEVICE, AND IMAGE FORMING APPARATUS INCLUDING THE DRIVING ASSEMBLY

CROSS-REFERENCE TO RELATED APPLICATIONS

This patent application is based on and claims priority pursuant to 35 U.S.C. §119 to Japanese Patent Application No. 2013-122727, filed on Jun. 11, 2013, in the Japan Patent Office, the entire disclosure of which is hereby incorporated by reference herein.

BACKGROUND

1. Technical Field

Exemplary aspects of the present invention generally relate to a transmission device, a driving assembly including the transmission device, and an image forming apparatus including the driving assembly, such as a copier, a facsimile machine, a printer, or a multi-functional system including a combination thereof.

2. Description of the Related Art

Image forming apparatuses such as a copier, a facsimile machine, a printer, or a multi-functional system including a combination thereof generally include rotary members such as a development roller, a photosensitive drum, and so forth driven by a transmission device such as a gear and a timing pulley.

In order to facilitate an understanding of the related art and of the novel features of the present disclosure, as a comparison, a description is provided of an example of a related-art transmission device with reference to FIG. 10. In the related-art transmission device, rotation of a motor 360 is decelerated by a drive gear 390 and a driven gear 300 of a decelerator 370, and a shaft 380 coaxial with the driven gear 300 is rotatably driven, thereby rotatably driving the rotary members such as the development roller, the photosensitive drum. On both sides of a housing 371 of the decelerator 370, a pair of shaft bearings 372 is coaxially disposed to support rotatably the shaft 380.

Torque from the driven gear 300 is transmitted to the shaft 380 by an engagement pin 381 such as a parallel pin and a spring pin. Such a configuration is proposed, for example, in JP-2002-266952-A. As illustrated in FIGS. 11A and 11B, the engagement pin 381 is fitted to a groove 312 formed in the diameter direction in the driven gear 300, thereby transmitting torque. The torque is transmitted by the engagement pin 381. Other known torque transmission structures include, for example, a substantially D-shaped or a rounded rectangular-shaped engagement portion at which the driven gear 300 and the shaft 380 are fitted, and a key and a keyways.

If, in the image forming apparatus, a vibration component of the motor 360, a vibration and a speed fluctuation component generated at the meshing portion of the gears 390 and 300 are transmitted to a driven side via the shaft 380, an image defect which appears as a horizontal streak in a toner image occurs. More specifically, the vibration generated at the meshing portion of a gear and a timing pulley causes easily such an image defect. In view of the above, the gear and the timing pulley need to be designed to produce less vibration and to prevent transmission of the vibration to the driven side even when the vibration is generated.

In a tandem-type image forming apparatus in which multiple toner images in different colors are transferred onto an intermediate transfer belt such that they are superimposed one atop the other, a load fluctuation occurs when the intermediate transfer belt contacts a recording medium intermittently at a secondary transfer portion at which a toner image is secondarily transferred onto the recording medium. Such a load fluctuation also causes an image defect with a horizontal streak or the like. In order to suppress the load fluctuation, stiffness of the transmission device in the direction of rotation needs to be enhanced.

In the known image forming apparatus, an elastic member is provided to the shaft or the gear to prevent the vibration from getting transmitted to the driven side. Such a configuration is proposed, for example, in JP-H09-114160-A. In this configuration, however, even when the elastic member suppresses transmission of the vibration and speed fluctuations to the shaft, the stiffness in the direction of rotation may be weakened. As a result, with the elastic member, if the load fluctuation occurs on the driven side of the shaft, the rotation speed may fluctuate significantly. In other words, it is difficult to prevent fluctuations in the rotation speed attributed to the vibration and the speed fluctuation on the drive side, while preventing fluctuations in the rotation speed attributed to the load fluctuation on the driven side.

The gear and the timing pulley made of resin are advantageous in suppression of the vibration at the meshing portion of the gear and also provide a greater degree of freedom in shaping or formativeness. However, strength, stiffness, and accuracy are not as good as ones made of metal. By contrast, the gear and the timing pulley made of metal are advantageous in strength, stiffness, and accuracy. However, vibration generated at the meshing portion of the gear tends to be greater than ones made with resin. As a result, either the gear or the pulley made of resin or the gear and the pulley made of metal may result in unevenness in a resulting image due to the vibration and the fluctuations in the speed in an image forming unit.

To address such a difficulty, in one approach, two or more gears are made with different materials. Such a configuration is proposed, for example, in JP-4435093-B2 (WO2005/046957A1). In this configuration, the gears are made of metal coated with resin, thereby enhancing strength, stiffness, shock resistance, wear resistance, durability, and noise reduction.

If the transmission device of FIG. 10 is constituted of two parts such as proposed in JP-4435093-B2 (WO2005/046957A1), a compound gear constituted of a metal core 301 and a resin gear 302 such as shown in FIG. 12 may be employed, for example. Such a compound gear may cause deformation at the meshing portion at which the metal gear and the resin gear mesh and a reduction in torque resistance at a press-fit portion due to a difference in the coefficient of linear thermal expansion between the metal and the resin.

Furthermore, the coaxiality between the resin gear 302 and the shaft 380 may be reduced by the metal core 301 disposed between the resin gear 302 and the shaft 380. As a result, the compound gear illustrated in FIG. 12 may worsen the fluctuation of rotation of the gear as compared with the configuration illustrated in FIG. 10.

In view of the above, there is a demand for a configuration capable of preventing fluctuations in the rotation speed caused by load fluctuations on the driven side by enhancing rotation stiffness with at least two transmission parts such as a driven gear while keeping the two parts coaxial relative to the shaft with ease.

SUMMARY

In view of the foregoing, in an aspect of this disclosure, there is provided an improved transmission device including a rotatable shaft, a first transmission member, and a second transmission member. The first transmission member includes a first fitting portion fitted coaxially to an outer circumferential surface of the rotatable shaft, and is attached to the rotatable shaft to transmit torque. The second transmission member is rotatably driven by a driving device and includes a second fitting portion fitted coaxially to the outer circumferential surface of the rotatable shaft. The second transmission member is connected coaxially to the first transmission member while the first and the second fitting portions are fitted to the outer circumferential surface of the rotatable shaft.

According to another aspect, a driving assembly for transmitting a driving force to a drive target includes the transmission device, a driving device to generate a driving force, a detector to detect a rotation speed of at least one of the rotary shaft of the transmission device and the drive target, and a controller to control a driving speed of the driving device based on a detection result provided by the detector. The driving force of the driving device is transmitted to the drive target via the shaft of the transmission device.

According to still another aspect, an image forming apparatus includes a rotary member to rotate in a predetermined direction and the driving assembly to rotatably drive the rotary member.

The aforementioned and other aspects, features and advantages would be more fully apparent from the following detailed description of illustrative embodiments, the accompanying drawings and the associated claims.

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein.

DETAILED DESCRIPTION

Figure 1:
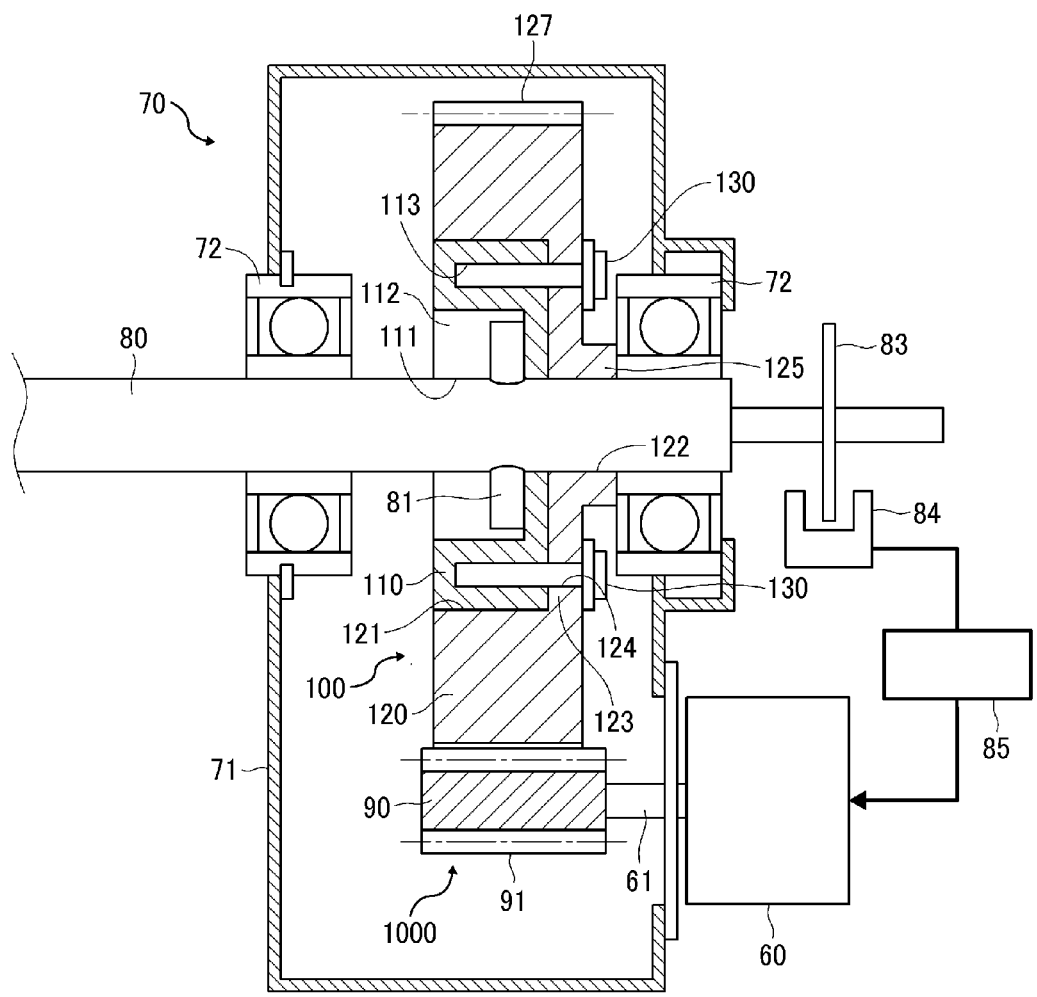
FIG. 1 is a schematic diagram illustrating a transmission device employing a transmission device according to an illustrative embodiment of the present disclosure.

A description is now given of illustrative embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but include other printable media as well.

Referring now to the drawings, wherein like reference numerals designate identical or corresponding parts throughout the several views, exemplary embodiments of the present patent application are described.

With reference to FIG. 1, a description is provided of a driving assembly using a transmission device 1000 including a driven gear 100 according to an illustrative embodiment of the present disclosure. The driving assembly transmits the number of rotation or the rotation speed of the motor 60 to a shaft 80 after decelerating the rotation speed of the motor 60 by a gear decelerator 70. The motor 60 may use a direct-current motor and a pulse motor.

The decelerator 70 includes a housing 71 in which a drive gear 90 and the driven gear 100 are enclosed. A rotary shaft 61 of the motor 60 is fixed to one side of the housing 71, and the drive gear 90 in the housing 71 is directly attached to the rotary shaft 61. As will be described later, a gear 91 of the drive gear 90 meshes with a gear 127 of the driven gear 100.

A pair of left and right shaft bearings 72 is coaxially disposed at both ends of the housing 71. The shaft 80 is rotatably supported by the pair of left and right shaft bearings 72. The driven gear 100 is fixed to the shaft 80 between the pair of left and right shaft bearings 72.

Figure 2:
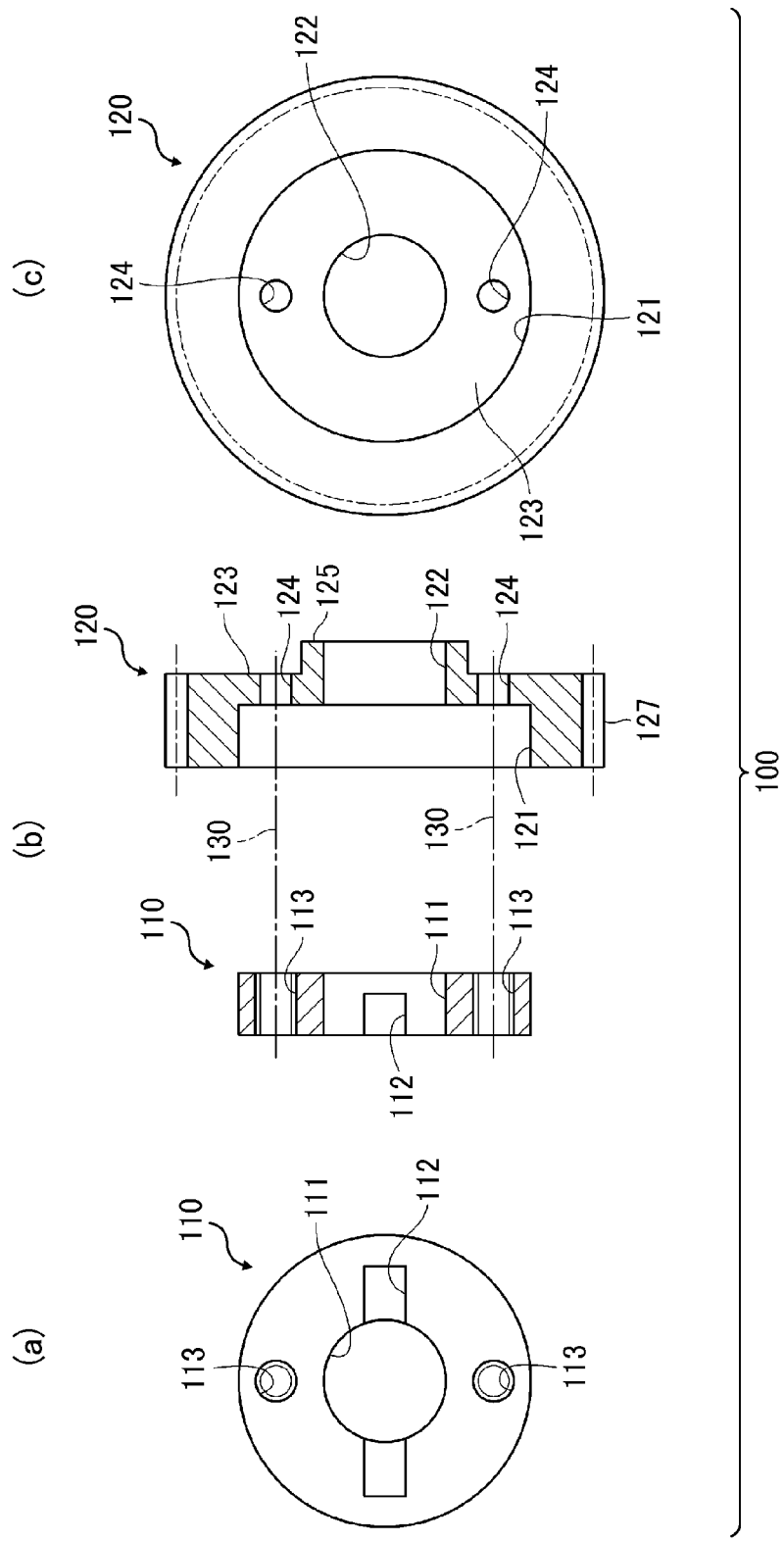
FIG. 2 illustrates a first transmission member and a second transmission member of the transmission device of FIG. 1 in a separated state.

As illustrated in FIG. 2, the driven gear 100 includes a first transmission member 110 made of metal and a second transmission member 120 made of resin. The first transmission member 110 is disposed at the center of the driven gear 100. The second transmission member 120 is fitted to the outer periphery of the first transmission member 110 and includes a gear 127 on the outer peripheral surface of the second transmission member 120.

Here, "metal" and "resin" imply an example of a typical combination of materials having a different degree of mechanical strength from each other. In other words, "metal" is not limited to metal, and "resin" is not limited to resin. Therefore, the first transmission member 110 and the second transmission member 120 are not necessarily made of metal and resin, respectively, as long as the first transmission member 110 and the second transmission member 120 are made of materials with different mechanical strengths.

The mechanical strength can be expressed, for example, by a longitudinal elastic modulus and a transverse elastic modulus. By making the first transmission member 110 and the second transmission member 120 of the driven gear 100 with different materials having different mechanical strengths, stiffness of the first transmission member 110 relative to the shaft 80 is enhanced. As for the second transmission member 120, the damping performance of the mechanical vibration can be enhanced.

More specifically, when the second transmission member 120 is molded with resin, a gear and a pulley having a complicated shape can be molded with ease and at low cost. Furthermore, vibration at the meshing portion can be suppressed effectively.

The first transmission member 110 made of metal includes a shaft hole 111 as a fitting portion through which the shaft 80 is inserted and a groove 112. The groove 112 is communicated with the shaft hole 111 and extends in the diameter direction. A later-described engagement pin 81 of the shaft 80 is fitted to the groove 112. The first transmission member 110 includes screw holes 113 formed in a direction parallel to the shaft hole 111 so as to connect to the second transmission member 120. Two screw holes 113 are formed in the first transmission member 110 in the diameter direction at 90-degree intervals relative to the groove 112.

The second transmission member 120 made of resin includes a circular depression 121 that accommodates the first transmission member 110. The circular depression 121 is formed in a cup shape with one side open. The first transmission member 110 is fitted to the depression 121 with a predetermined tolerance. The second transmission member 120 includes, at a side opposite to the open side, an end wall 123 surrounding a shaft hole 122 as a fitting portion through which the shaft 80 is inserted. A through hole 124, through which a screw 130 is inserted to connect to the first transmission member 110, is formed in the end wall 123. Furthermore, the end wall 123 includes a cylindrical projection 125 formed to surround the shaft hole 122. The projection 125 contacts the shaft bearing 72 of the housing 71.

Figure 3:
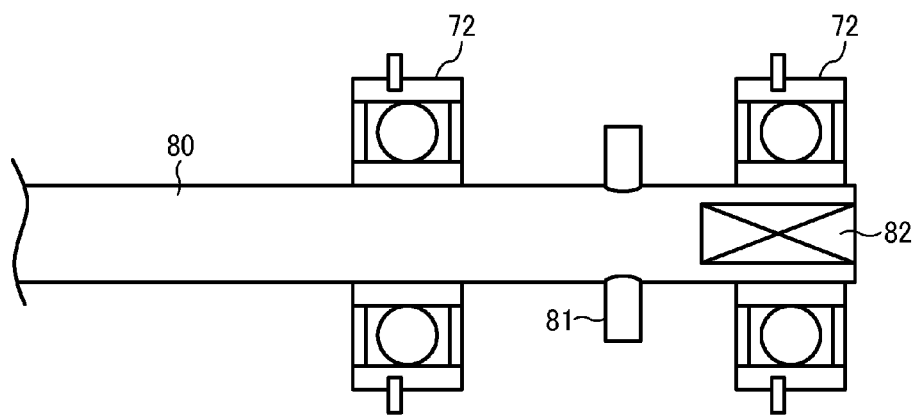
FIG. 3 is a lateral view schematically illustrating a shaft of the transmission device.

The shaft 80 is constituted of a metal rod. As illustrated in FIG. 3, the engagement pin 81 is attached to the shaft 80 in an integrated manner in the diameter direction between the pair of left and right shaft bearings 72 disposed in the housing 71. The engagement pin 81 for transmission of torque engages the first transmission member 110 in the direction of rotation. The engagement pin 81 may be constituted of a parallel pin and a spring pin. The engagement pin 81 is inserted into a through hole formed in the shaft 80 in the diameter direction thereof.

According to the present illustrative embodiment, the engagement pin 81 is inserted to the through hole of the shaft 80. Alternatively, the engagement pin 81 and the shaft 80 may be constituted as a single integrated unit. Alternatively, the shaft hole 111 may have a modified cross sectional shape such as a D-shape or a rounded rectangular shape, and the outer shape of the shaft 80 is formed into a shape that fits with the modified cross sectional shape of the shaft hole 111. Accordingly, torque is transmitted without the engagement pin 81.

Figure 4A:
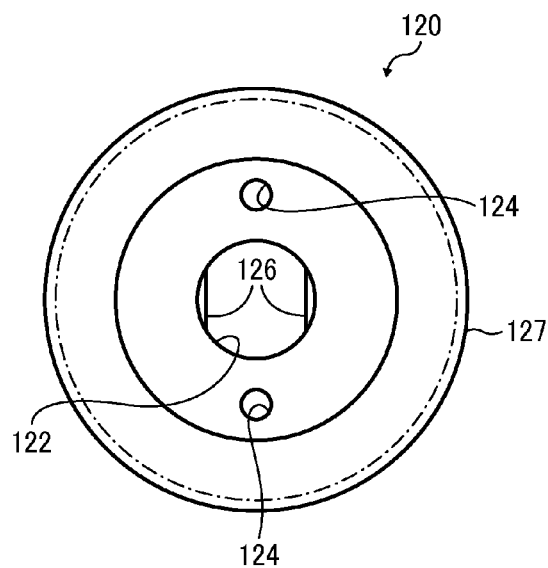
FIG. 4A is a front view schematically illustrating a variation of the second transmission member.
Figure 4B:
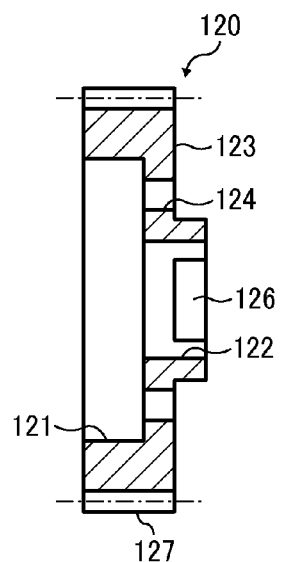
FIG. 4B is a cross-sectional view schematically illustrating the variation of the second transmission member.

In order to transmit torque to the shaft 80 using a device other than the engagement pin 81 and to regulate a relative rotation position relative to the shaft 80, as illustrated in FIG. 4, the shape of the inner circumferential surface of the shaft hole 122 of the second transmission member 120 may be molded in a modified shape in cross-section. In the example shown in FIG. 4, a pair of planar members 126 as a first regulator is formed facing the inner circumferential surface of the shaft hole 122, and the shaft hole 122 has a substantially rounded rectangular shape in cross-section. A planar member 82 as the first regulator is formed on the outer circumferential surface of the shaft 80 to fit with the planar members 126.

An encoder wheel 83 is attached to a portion of the shaft 80 projecting beyond the shaft bearing 72. An optical detector 84 detects the encoder wheel 83, thereby detecting the number of rotation of the shaft 80. Detection results are provided to a controller 85. The controller 85 performs feedback control such as proportional-integral (PI) control or proportional integral derivative (PID) control on the rotation speed and the rotation position of the motor 60, thereby reducing a periodic component of the motor 60.

Figure 5:
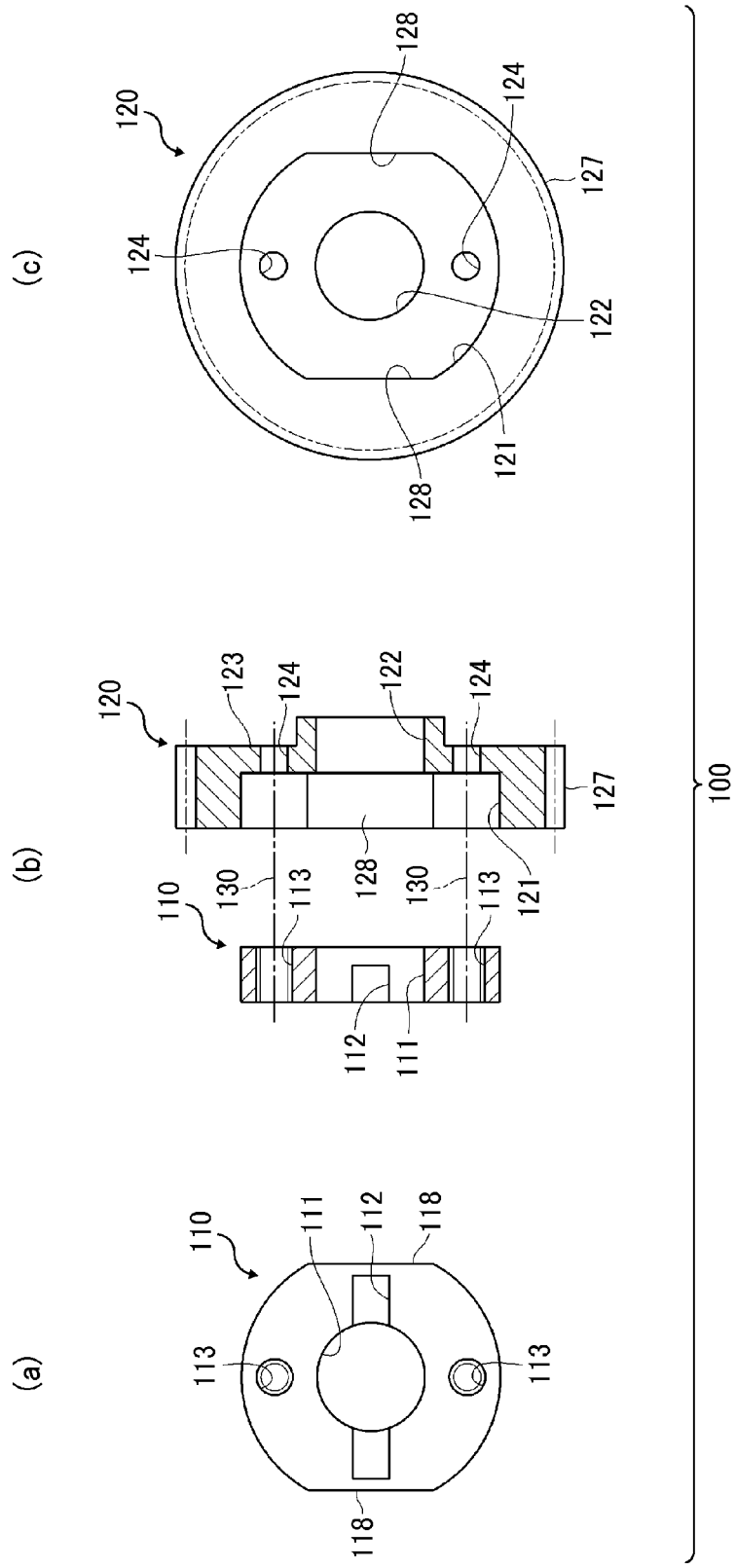
FIG. 5 illustrates the first transmission member and the second transmission member of the transmission device in a state in which the first transmission member and the second transmission member are positioned in place relative to the shaft.

FIG. 5 illustrates a configuration for positioning the first transmission member 110 and the second transmission member 120 on the shaft 80 in the rotation direction. Because the first transmission member 110 and the second transmission member 120 are to be connected by two screws 130, the first transmission member 110 and the second transmission member 120 cannot be assembled smoothly unless the positions of the first transmission member 110 and the second transmission member 120 in the rotation direction are arranged correctly.

In view of the above, as illustrated in FIG. 5, second regulators, that is, rounded rectangular-shaped planar members 118 and 128 (second regulator) facing each other in the diameter direction are formed on the outer circumferential surface of the first transmission member 110 and on the inner circumferential surface of the depression 121, respectively. With the rounded rectangular shape, the first transmission member 110 and the second transmission member 120 are positioned in place in the direction of rotation, thereby allowing the screw 130 to be inserted through the screw hole 113 of the first transmission member 110 and the through hole 124 of the second transmission member 120 while the screw hole 113 and the through hole 124 are positioned in place accurately.

Figure 6:
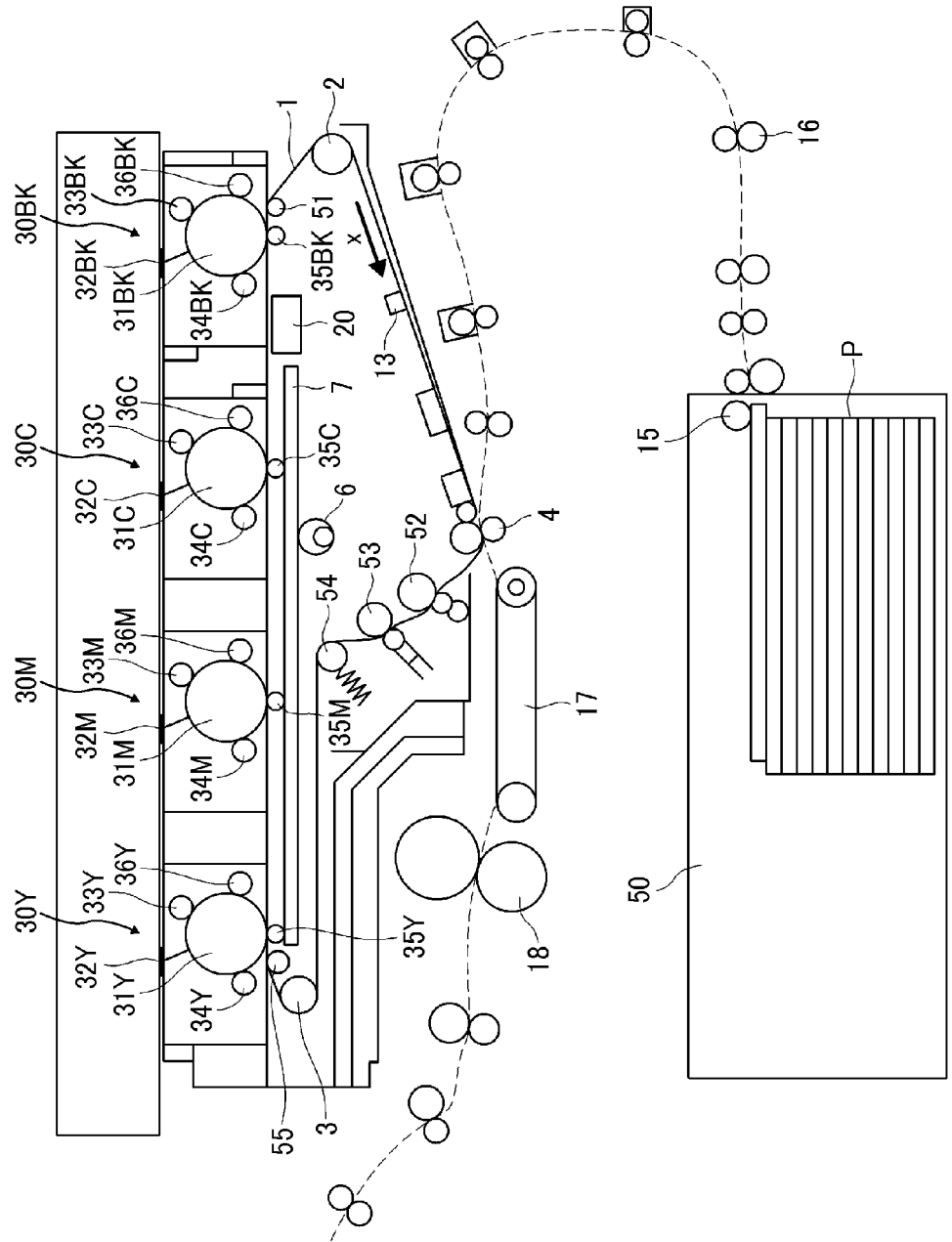
FIG. 6 is a schematic diagram illustrating an image forming apparatus employing the transmission device according to an illustrative embodiment of the present disclosure.

The transmission device and the driving assembly described above are employed in an image forming apparatus such as shown in FIG. 6. FIG. 6 is a schematic diagram illustrating an example of the image forming apparatus according to an illustrative embodiment of the present disclosure. The transmission device 1000 and the driving assembly described above are employed in the image forming apparatus to drive a drive target such as a drive roller 2 of an intermediate transfer belt 1 shown in FIG. 6, for example.

The image forming apparatus includes the intermediate transfer belt 1. The intermediate transfer belt 1 serves as an image bearing member similar to a later-described photosensitive drum. The intermediate transfer belt 1 is supported by the drive roller 2, a secondary transfer roller 4, and a plurality of driven rollers 51, 52, 53, and 54 at a predetermined tension. Substantially above the intermediate transfer belt 1, image forming units 30Y, 30M, 30C, and 30Bk for each of the colors yellow (Y), magenta (M), cyan (C), and black (Bk), respectively, are arranged in tandem in a traveling direction X of the intermediate transfer belt 1.

It is to be noted that suffixes Y, M, C, and Bk denote colors yellow, magenta, cyan, and black, respectively, and to simplify the description, the suffixes Y, M, C, and Bk indicating colors are omitted herein, unless otherwise specified. The arrangement of colors is not limited to the above order. The order of the colors may be changed as needed.

The image forming units 30Y, 30M, 30C, and 30Bk include photosensitive drums 31Y, 31M, 31C, and 31Bk, respectively, which are rotatably supported by a frame of a main body of the image forming apparatus. The photosensitive drums 31Y, 31M, 31C, and 31Bk are an example of the image bearing member. The image forming units 30Y, 30M, 30C, and 30Bk include image writers 32Y, 32M, 32C, and 32Bk respectively, that scan the surface of the photosensitive drums 31Y, 31M, 31C, and 31Bk with exposure light. The photosensitive drums 31Y, 31M, 31C, and 31Bk are surrounded respectively by charging devices 33Y, 33M, 33C, and 33Bk, development devices 34Y, 34M, 34C, and 34Bk, primary transfer rollers 35Y, 35M, 35C, and 35Bk, and cleaning devices 36Y, 36M, 36C, and 36Bk.

The primary transfer rollers 35Y, 35M, and 35C disposed at the upstream side (upstream from the primary transfer roller 35Bk) in the traveling direction X among the primary transfer rollers 35Y, 35M, 35C, and 35Bk are held by a bracket 7 disposed below the primary transfer rollers 35Y, 35M, and 35C. A moving device 6 is disposed below the bracket 7. As the moving device 6 is driven by a moving-device drive motor, the position of the primary transfer rollers 35Y, 35M, and 35C held by the bracket 7 changes relative to the photosensitive drums 31Y, 31M, and 31C. In other words, the distance between the primary transfer rollers 35Y, 35M, and 35C, and the photosensitive drums 31Y, 31M, and 31C change.

In this configuration, the moving device 6 when being driven moves the primary transfer rollers 35Y 35M, and 35C to contact and separate from the photosensitive drums 31Y, 31M, and 31C, thereby switching between a single-color mode (i.e., a single-color image forming mode) and a full-color mode (i.e., a full-color image forming mode).

A belt scale is formed on the intermediate transfer belt 1. More specifically, the belt scale consists of a reflective portion and a non-reflective portion which are alternately arranged at a certain cycle along the traveling direction X of the intermediate transfer belt 1. Substantially near the intermediate transfer belt 1, a belt scale detector 20 is disposed to read the belt scale. The belt scale detector 20 outputs a pulse signal corresponding to the certain cycle of the belt scale on the intermediate transfer belt 1, thereby detecting a rotation speed of the intermediate transfer belt 1.

According to the illustrative embodiment, a recording medium P subjected to image formation herein refers to, but is not limited paper. A stack of recording media P is stored in a sheet cassette 50, and a pickup roller 15 disposed at a feeding side of the sheet cassette 50 picks up the top sheet from the stack of the recording media P one sheet at a time. The recording medium P being fed is transported by a predetermined number of roller pairs 16 along a sheet delivery path indicated by a broken line in FIG. 6.

Now, a description is provided of formation of a color image by the image forming apparatus described above.

First, writing of images is initialized in each of the image forming units 30Y, 30M, 30C, and 30Bk. Next, toner images in the colors yellow, magenta, cyan, and black are primarily transferred onto the intermediate transfer belt 1 such that they are superimposed one atop the other in the process known as primary transfer, thereby forming a composite toner image (color image). Subsequently, the composite toner image is delivered to a secondary transfer roller 4 along with the movement of the intermediate transfer belt 1. The composite image on the intermediate transfer belt 1 is transferred onto the recording medium P at the secondary transfer roller 4.

The recording medium P onto which the color image is transferred is delivered to a fixing device 18 by a sheet conveyor 17. In the fixing device 18, heat and pressure are applied to the toner image on the recording medium P, thereby fixing the toner image on the recording medium P. After fixing, the recording medium P is discharged onto a sheet output tray. In order to prevent belt skew of the intermediate transfer belt 1, an edge detector 13 is disposed to detect the position of the intermediate transfer belt 1 in a width direction thereof. Based on the detection result of the edge detector 13, a steering control roller 3 is moved or tilted, accordingly. For example, a controller such as a central processing unit (CPU) in the image forming apparatus controls the steering control roller 3 based on the detection result of the edge detector 13.

Figure 7A:
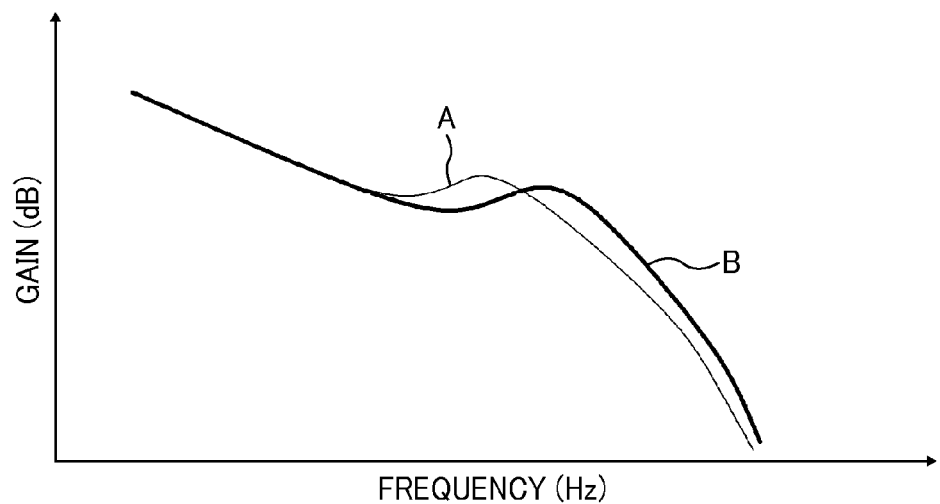
FIGS. 7A and 7B are graphs showing frequency characteristics of an intermediate transfer belt.
Figure 7B:
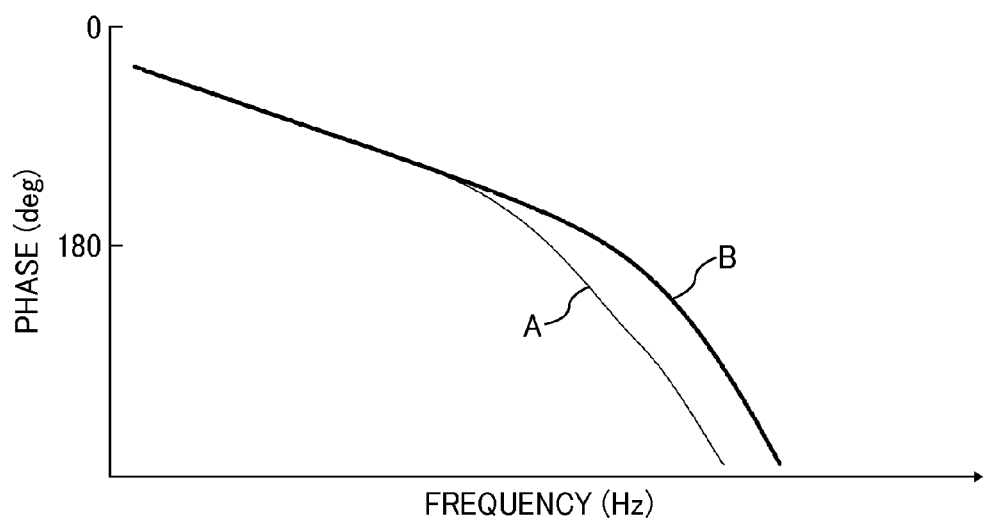
Figure 10:
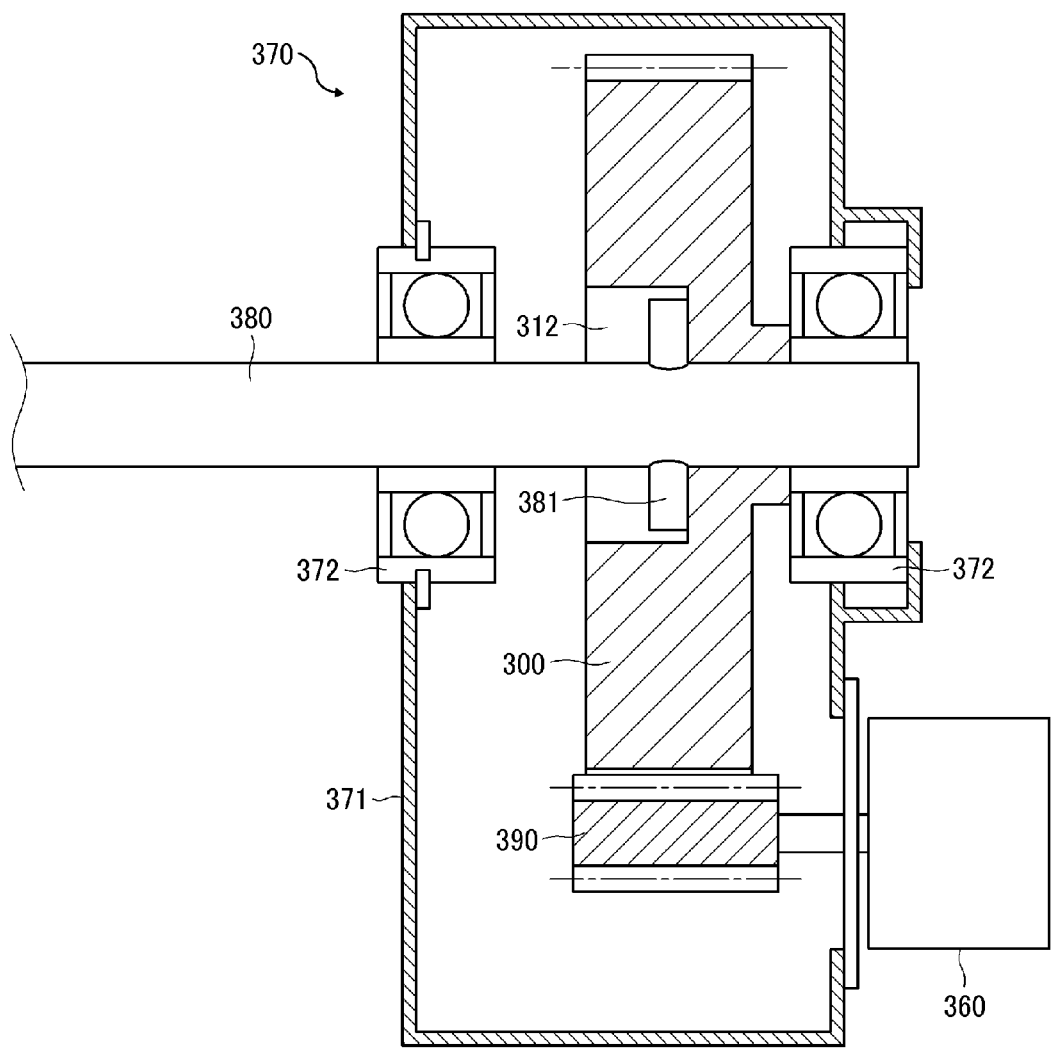
FIG. 10 is a schematic diagram illustrating a related-art transmission device.
Figure 11A:
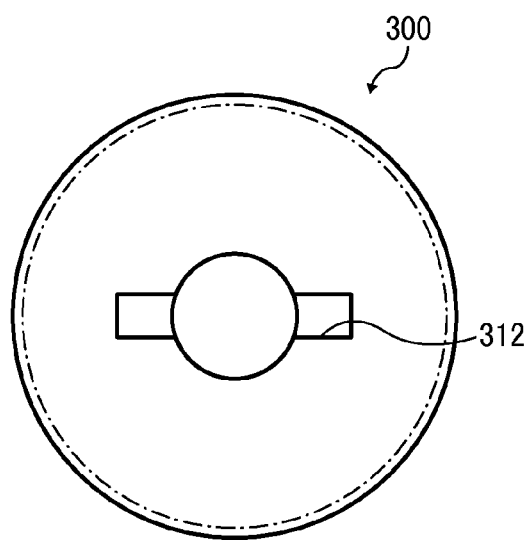
FIG. 11A is a front view illustrating a transmission member employed in the related-art transmission device.
Figure 11B:
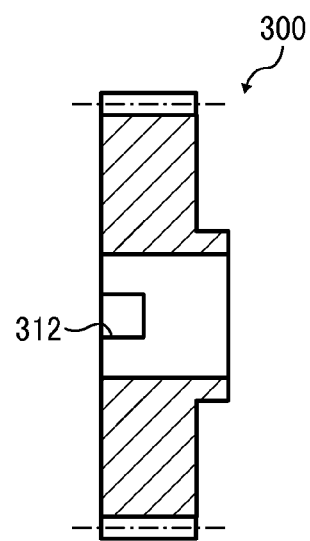
FIG. 11B is a cross-sectional view schematically illustrating the transmission member employed in the related-art transmission device.

Next, with reference to FIGS. 7A and 7B, a description is provided of frequency characteristics of speed fluctuations of the drive roller 2 when being driven. FIGS. 7A and 7B shows the frequency characteristics of both the related-art resin integrated driven gear 300 shown in FIG. 10 and of the two-part driven gear 100 consisting of the first transmission member 110 and the second transmission member 120 of the illustrative embodiment of the present disclosure as shown in FIG. 1.

FIG. 7A is a graph showing a relation between a frequency (Hz) and a gain (dB). FIG. 7B is a graph showing a relation between a frequency (Hz) of speed fluctuations and a phase shift. In FIGS. 7A, 7B, 8, and 9, a thin line A represents the related-art driven gear 300 shown in FIG. 10, and a bold line B represents the driven gear 100 of the illustrative embodiment of the present disclosure. The number of rotation of the rotary shaft of the drive roller 2, that is, the shaft 80 is detected by the optical detector 84 to suppress rotation fluctuations. Thus, it is necessary to secure a sufficient control bandwidth.

FIG. 7A shows a comparison made with frequency response results based on output of the voltage of the motor 60 and the optical detector 84. As is understood from FIG. 7A, because the driven gear 100 of the illustrative embodiment shown in FIG. 1 is constituted of two parts, that is, the first transmission member 110 and the second transmission member 120, the stiffness of the driven gear 100 is enhanced and hence the frequency that resonates can be shifted to a higher frequency. Accordingly, a wide control bandwidth can be secured, thereby suppressing effectively rotation fluctuations.

Figure 8:
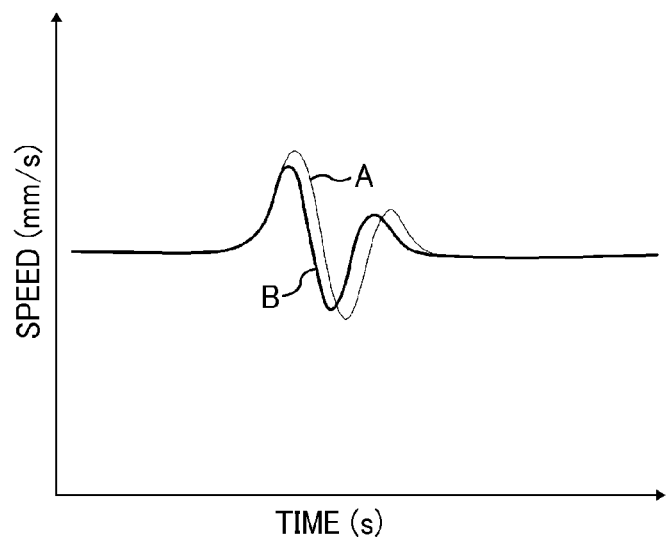
FIG. 8 is a graph showing fluctuations in a speed of a drive roller due to load fluctuations of the intermediate transfer belt.

FIG. 8 is a graph showing speed fluctuations of the drive roller 2. When transferring a toner image onto a recording medium P at the secondary transfer portion of the intermediate transfer belt 1 facing the secondary transfer roller 4, load on the intermediate transfer belt 1 fluctuates as the leading end of the recording medium P enters the secondary transfer portion and as the rear end of the recording medium exits the secondary transfer portion.

When the load fluctuates, a speed error and a positional error occur between the photosensitive drum surface and the intermediate transfer belt 1 at the primary transfer portion, thereby producing an undesirable horizontal streak in the toner image on the intermediate transfer belt 1. Such a horizontal streak in the toner image can be prevented by increasing stiffness of the driving portion of the intermediate transfer belt 1 and hence reducing the speed and positional fluctuations attributed to the load fluctuations as illustrated in FIG. 8.

Figure 9:
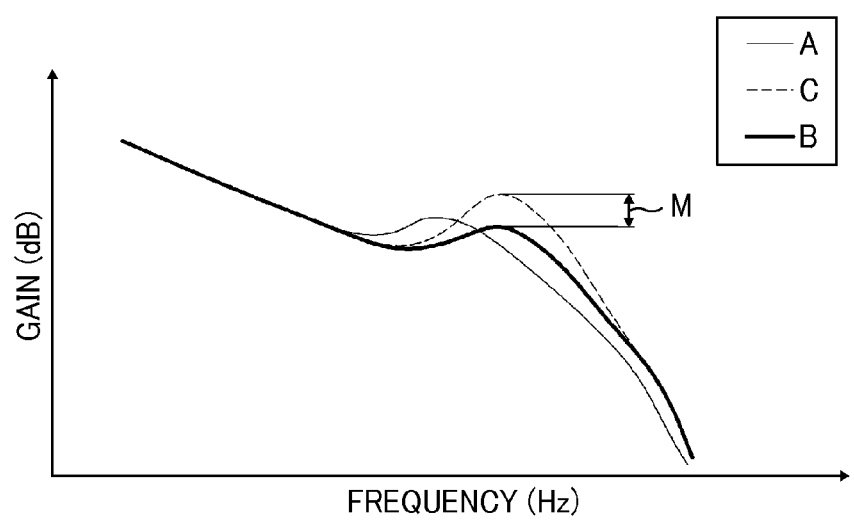
FIG. 9 is a graph showing frequency characteristics of the intermediate transfer belt.
Figure 12:
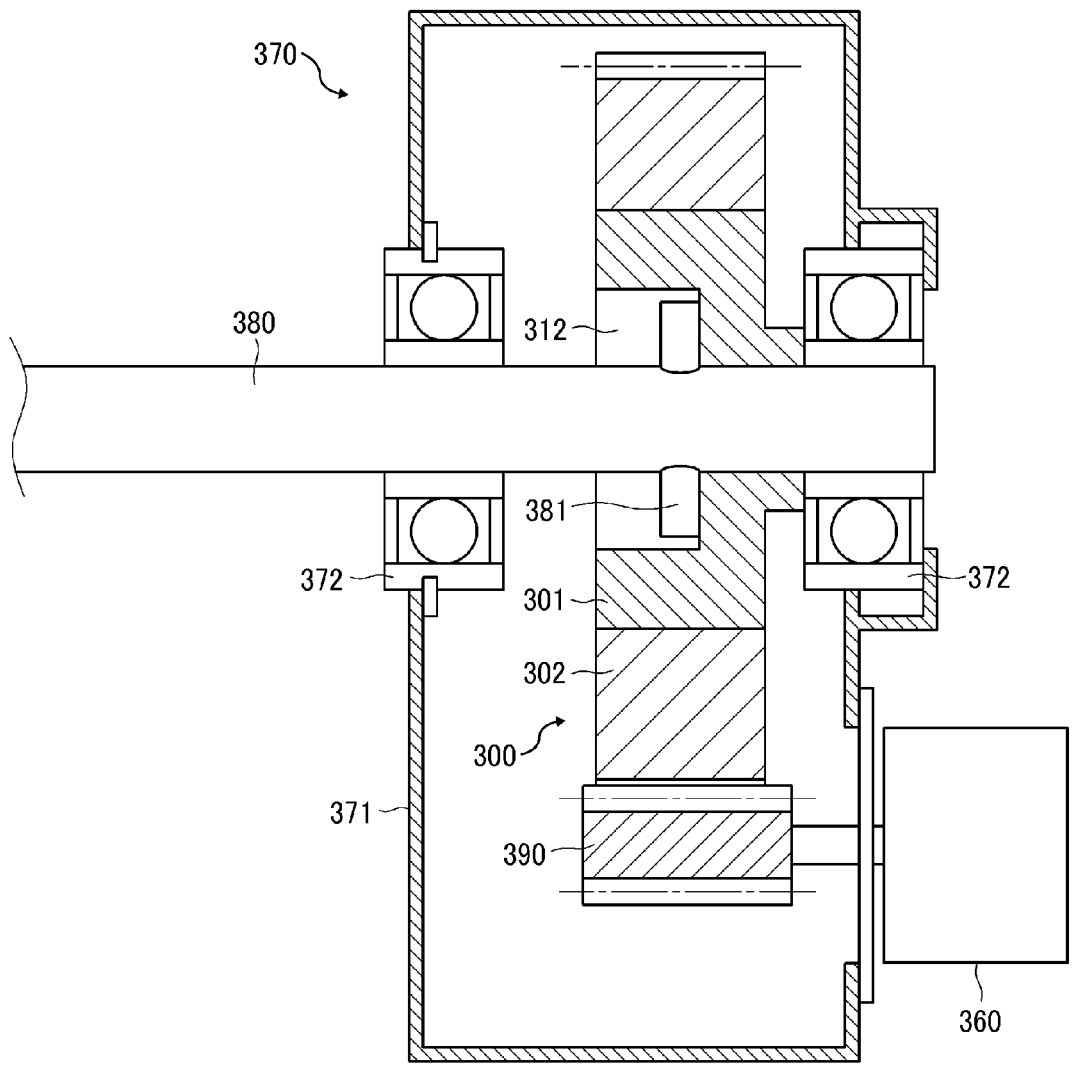
FIG. 12 is a schematic diagram illustrating a related-art transmission device using a compound gear consisting of metal and resin gears.

FIG. 9 is a graph showing results of experiments in which the related-art compound gear with metal and resin such as shown in FIG. 12 and the compound gear of the illustrative embodiment of the present disclosure shown in FIG. 1 have the same stiffness, and frequencies and characteristics of gain are studied. A broken line C indicates the related-art metal-resin compound gear of FIG. 12. A reference character "M" indicates a decrease in the gain (dB) at the peak frequency in the illustrative embodiment as compared with the related-art metal-resin compound gear.

The related-art compound gear shown in FIG. 12 did not achieve accurate coaxiality, and as a result, rotation fluctuations occurred and the gain (dB) of resonant peak frequency increased. Consequently, it is difficult to preform reliable feedback control. Furthermore, an increase in the gain (dB) of the resonant peak frequency causes vibration to be transmitted easily.

By contrast, according to the present illustrative embodiment, the metal first transmission member 110 and the resin second transmission member 120 are connected, while the metal first transmission member 110 and the resin second transmission member 120 are coaxial with the shaft 80 with precision. With this configuration, the gain at the resonant section is reduced as compared with the related-art gear shown in FIG. 12. Because the damping performance of the present illustrative embodiment is good, a controllable frequency region can be maintained at a higher level than that of the compound gear of FIG. 12.

The sheet cassette 50 of the present illustrative embodiment is not limited to the tandem-type image forming apparatus shown in FIG. 1, but may be employed in a four-cycle color image forming apparatus, a monochrome image forming apparatus, and a multi-functional machine including at least one of functions of copier, printer, and facsimile.

According to the present illustrative embodiment, the encoder wheel 83 and the optical detector 84 detect the number of rotation of the shaft 80. Alternatively, the belt scale detector 20 or the like may detect the belt scale and a toner mark formed on the surface of the intermediate transfer belt 1, thereby detecting the rotation speed of the intermediate transfer belt 1. Subsequently, the detection result is input in the controller 85.

The control performed by the controller 85 is not limited to the proportional-integral (PI) control and the proportional integral derivative (PID) control, but may include proportional (P) control and H-infinity (H∞) control and so forth. In order to increase the contact ratio of the drive gear 90 and the driven gear 100, the driven gear 100 may be constituted of an internal gear. The toner employed in development may be a two-component toner instead of a single-component toner.

According to the illustrative embodiment of the present disclosure, the first transmission member 110 and the second transmission member 120 are positioned in place relative to the outer diameter of the shaft 80 as a reference. Accordingly, the first transmission member 110 and the second transmission member 120 are kept coaxial relative to the shaft 80 with precision, thereby suppressing rotation fluctuations of the gears. Furthermore, coaxiality of the first transmission member 110 relative to the shaft 80 is reliably maintained. Thus, by molding the first transmission member 110 with sintered metal, displacement or an inclination of the gear due to load fluctuations can be suppressed. By contrast, when using a resin gear produced through known injection molding, it is difficult to maintain accuracy of parts including the groove 112, into which the engagement pin 81 is fitted, due to a draft angle. As a result, the degree of inclination of gear according to load fluctuations is large.

According to the present illustrative embodiment, the shaft 80 is provided as a main reference and includes a D-shaped cut or a rounded rectangular shaped portion, thereby allowing positioning of the second transmission member 120 in the rotation direction thereof. By regulating the second transmission member 120 in the rotation direction, the connecting portions of the first transmission member 110 and the second transmission member 120 are aligned so that the fastening position can be found easily when using a different fastening member such as a screw, thereby facilitating assembly.

According to the present illustrative embodiment, the first transmission member 110 and the second transmission member 120 are made of different materials. With this configuration, suitable materials can be selected to satisfy a desired gear accuracy on one hand and a desired stiffness on the other, thereby optimizing both the gear accuracy and the stiffness.

According to the present illustrative embodiment, the first transmission member 110 is made of material such as metal having a relatively high mechanical strength to enhance stiffness at the engagement portion with the shaft 80. By contrast, the second transmission member 120 is made of material having a relatively low mechanical strength such as resin to reduce vibration generating at the gear portion.

According to the present illustrative embodiment, the stiffness of both the first transmission member 110 and the second transmission member 120 in the direction of rotation is increased. Accordingly, the rotation stiffness, which cannot be obtained in a general resin gear, can be secured. With this configuration, in the feedback control such as the proportional-integral (PI) control and the proportional integral derivative (PID) control, the resonant peak frequency is shifted to a higher frequency, hence increasing controllability and damping performance at the resonant peak frequency.

According to the illustrative embodiment of the present disclosure, a first transmission member and a second transmission member are kept coaxial relative to a shaft at an engagement portion, and in this state, the second transmission member is connected to the first transmission member. With this configuration, the first transmission member and the second transmission member are reliably and easily kept coaxial with respect to the shaft, thereby suppressing rotation fluctuations. Because the first transmission member and the second transmission member are connected, rotation stiffness can be enhanced, and fluctuations in the rotation speed attributed to a load fluctuation on the driven side can be prevented.

According to an aspect of this disclosure, the present invention is employed in the image forming apparatus. The image forming apparatus includes, but is not limited to, an electrophotographic image forming apparatus, a copier, a printer, a facsimile machine, and a multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Still further, any one of the above-described and other exemplary features of the present invention may be embodied in the form of an apparatus, method, or system.

For example, any of the aforementioned methods may be embodied in the form of a system or device, including, but not limited to, any of the structure for performing the methodology illustrated in the drawings.

Each of the functions of the described embodiments may be implemented by one or more processing circuits. A processing circuit includes a programmed processor, as a processor includes a circuitry. A processing circuit also includes devices such as an application specific integrated circuit (ASIC) and conventional circuit components arranged to perform the recited functions.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. A transmission device, comprising:
   a rotatable shaft;
   a first transmission member including a first fitting portion fitted coaxially to an outer circumferential surface of the rotatable shaft, the first transmission member being attached to the rotatable shaft to transmit torque; and
   a second transmission member rotatably driven by a driving device and including a second fitting portion fitted coaxially to the outer circumferential surface of the rotatable shaft, the second transmission member being connected coaxially to the first transmission member while the first fitting portion and the second fitting portion are fitted coaxially to the outer circumferential surface of the rotatable shaft.

2. The transmission device according to claim 1, further comprising a first regulator disposed between the rotatable shaft and the second transmission member, to regulate a relative rotation position of the second transmission member with respect to the rotatable shaft,
   wherein the second transmission member is connected to the first transmission member in a state in which the relative rotation position of the second transmission member in a direction of rotation of the rotatable shaft is regulated by the first regulator.

3. The transmission device according to claim 2, further comprising a second regulator disposed between the first transmission member and the second transmission member, to regulate the relative rotation position,
   wherein the second transmission member is connected to the first transmission member in a state in which the relative rotation position in the direction of rotation is regulated by the second regulator.

4. The transmission device according to claim 1, wherein the first transmission member and the second transmission member are made of different materials.

5. The transmission device according to claim 4, wherein the first transmission member is made of material having a mechanical strength higher than that of the second transmission member.

6. The transmission device according to claim 4, wherein the first transmission member is made of metal and the second transmission member is made of resin.

7. A driving assembly for transmitting a driving force to a drive target, comprising:
   a driving device to generate a driving force;
   the transmission device of claim 1;
   a detector to detect a rotation speed of at least one of the rotary shaft of the transmission device and the drive target; and
   a controller to control a driving speed of the driving device based on a detection result provided by the detector,
   the driving force of the driving device being transmitted to the drive target via the shaft of the transmission device.

8. An image forming apparatus, comprising:
   a rotary member to rotate in a predetermined direction; and
   the driving assembly of claim 7 to rotatably drive the rotary member.

9. The image forming apparatus according to claim 8, wherein the rotary member is an image bearing member.

* * * * *